Patented Jan. 8, 1952

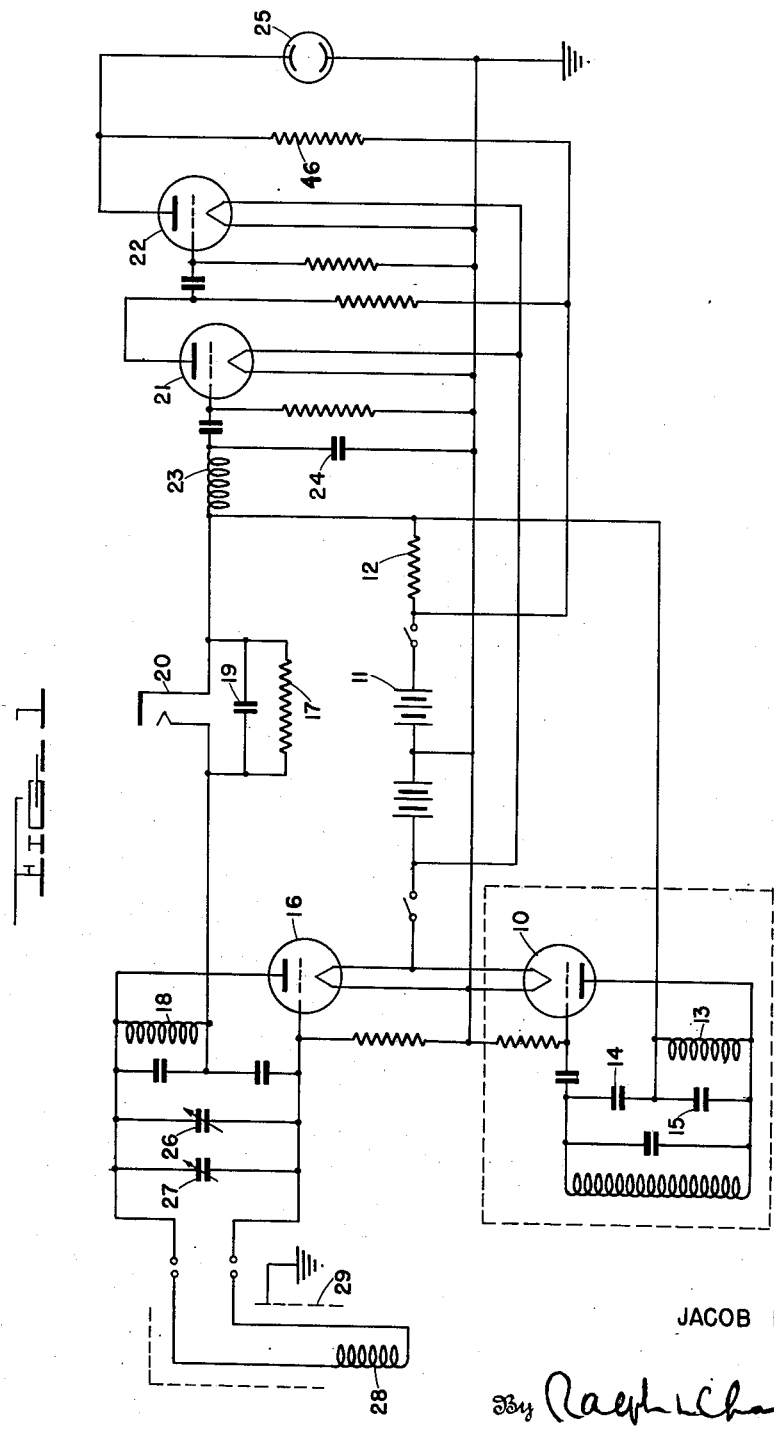

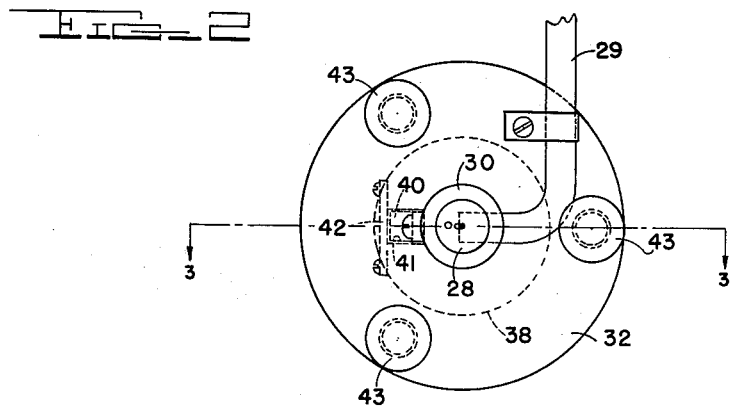
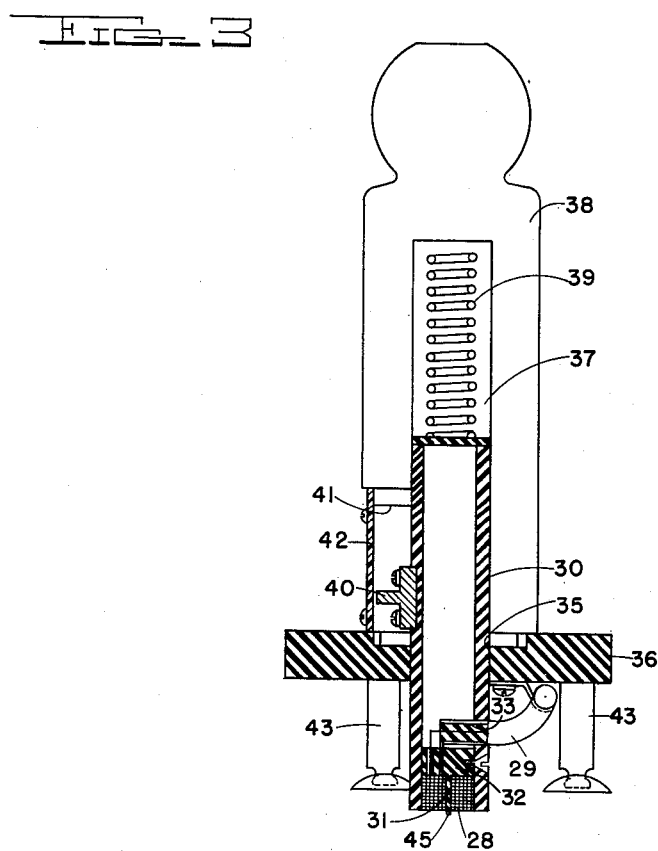
Inventor
JACOB E. DINGER
By Ralph L Chappell
Attorney

2,581,394

UNITED STATES PATENT OFFICE 2,581,394

METHOD OF AND APPARATUS FOR MEASURING THE THICKNESS OF NONCONDUCTING COATINGS OR FILMS

Jacob E. Dinger, Washington, D. C.

Application August 20, 1945, Serial No. 611,672

14 Claims. (Cl. 33—147)

(Granted under the act of March 3, 1883, as amended April 30, 1928; 370 O. G. 757)

This invention relates to a method of and apparatus for measuring the thickness of non-conducting coatings and of thin films in contact with non-magnetic conductors.

Insofar as this application discloses subject matter common to my prior filed application S. N. 495,776, filed July 22, 1943, later abandoned, this application may be considered as a continuation in part thereof.

It is often desirable to measure the thickness of a paint film or of layers of insulation which have been applied to non-magnetic surfaces. Because of the presence of the film it may be impractical to employ a mechanical device such as a micrometer.

An object of this invention is to provide an efficient and effective method of and apparatus for measuring the thickness of non-conducting coatings and of thin films in contact with non-magnetic conductors.

A further object of this invention is to provide an efficient and effective method of and apparatus for measuring film thicknesses on curved surfaces.

A further object of this invention is to provide an efficient and effective method of and apparatus for measuring the thickness of non-conducting coatings in contact with non-magnetic conductors which will be independent of the particular composition of the coating material being measured and of the nature of the non-magnetic conducting surface underneath.

In accordance with one embodiment of this invention an apparatus may be provided comprising a pair of electronic oscillators, one of fixed frequency and one variable, and a coupling circuit whereby the difference in the oscillator frequencies may be determined. The inductance of the tuned circuit in the variable oscillator comprises a small coil connected to the oscillator by a shielded cable. The coil is mounted at one end of a probe and a pivot button is provided in the center of the end of the probe whereby the center of the coil is maintained at a predetermined distance from the surface of the coating being measured so that the effects of tipping are greatly reduced and coatings on surfaces having a radius of curvature may be accurately measured. By bringing the coil into contact with the film or coating the thickness of which is to be measured, the apparent inductance of the coil changes, due to the presence of the conductor beneath the film and hence the frequency of the oscillator changes as a function of the proximity of the coil and conductor, or film thickness. This change in frequency is utilized as an indication of the thickness of the film or coating.

Other objects and advantages of the present invention will be apparent from the following detailed description taken in conjunction with the drawings, wherein:

Fig. 1 is a schematic view of a circuit which may be used with this invention;

Fig. 2 is an elevational view of the lower end of a pick-up probe constructed in accordance with one embodiment of this invention; and, Fig. 3 is a sectional view taken substantially along the line 3—3 of Fig. 2, partly in elevation.

The operation of this invention is predicated on the fact that as a coil is brought near an electrical conductor, the apparent inductance of the coil will change. Since a coating on the electrical conductor, or a film thereover, will prevent the coil from being placed in contact with the conductor but rather will space the coil from the conductor a distance equivalent to the thickness of the coating or film, by comparing the inductance of the coil when in contact with the conductor, or when a predetermined known distance therefrom, with the inductance of the coil when spaced therefrom by a coating or film thereover, the difference in inductance may be utilized to provide an accurate measure of the thickness of the film or coating.

While any suitable method may be employed whereby the inductance of the coil may be accurately measured, it has been found in practice that the heterodyne principle may be employed with considerable facility and hence a suitable circuit for employing this principle is illustrated in Fig. 1.

Referring now to Fig. 1, a fixed oscillator circuit is shown constructed around a tube 10. This oscillator circuit is a modified Colpitts circuit (preferably shielded) in which a positive potential is supplied to the anode of the tube 10 from a battery 11 through an impedance 12 and a choke 13. The alternating current output of the oscillator is obtained from between capacitances 14 and 15 and is developed across the impedance 12.

A variable oscillator is constructed around a tube 16 in the same manner and employing the same circuit as the fixed oscillator. The anode of the tube 16 is supplied with positive potential from the battery 11 through the impedance 12, impedance 17 and a choke 18. The impedance 17 is by-passed by a capacitance 19 so as to avoid loss of output from the variable oscillator in the impedance 17. Since the two oscillators are coupled through the common impedance 12 the difference in their frequencies, or beat frequency, may be obtained from the impedance 12. This is done, for aural observation, by connecting a pair of phones in the circuit at the point indicated by a phone jack 20. The purpose of the impedance 17 is to provide a direct current path to the anode of the tube 16 in the event that the phones are not used.

For visual observation of the beat frequency, the alternating current potential across the impedance 12 is applied to a two stage resistance coupled amplifier constructed around tubes 21 and 22. To prevent the output frequencies of the two oscillators from passing into the amplifier along with the beat frequency, a simple filter circuit comprising an inductance 23 and a capacitance 24 is employed. In the anode circuit of the tube 22 a small glow discharge tube 25, such as a ¼ watt neon tube, is placed in series with a load resistance 46. The resistance 46 is chosen so that the tube 25 will just glow when the tube 22 is non-conducting, or when the tube 22 is removed from the circuit. When no signal is applied to the grid of tube 22 the plate current is sufficient to produce an IR potential drop across the resistance 46 which is large enough to reduce the potential across the neon tube 25 below its igniting potential so that the neon tube 25 is extinguished when the beat frequency is zero. When a signal is applied to the grid of tube 22 the plate current will be decreased each half cycle to such an extent that the potential across the neon tube 25 will rise above the igniting potential. Thus the neon tube 25 will flash each half cycle of the beat frequency and will cease to glow when the beat frequency is zero.

Unlike the tuned circuit of the fixed oscillator, the tuned circuit of the variable oscillator comprises at least two variable capacitances 26 and 27 and an inductance or coil 28 connected to the capacitances 26 and 27 by means of a shielded cable 29, the coil 28 serving as the sensitive element in measuring the thickness of a coating or film in accordance with this invention. The coil 28 may be made in any desired form and have any suitable inductance value; however, an annular coil having an inductance of approximately 2 to 4 millihenries has proven satisfactory in practice. The coil 28 is, as shown in Figs. 2 and 3, mounted in the lower end of a tubular housing 30, being wound on a core 31 integrally formed with the central portion of the lower side of a cylindrical block 32 which is securely mounted in the lower end of the housing 30. Both the housing 30 and the block 32 are made of an electrical insulating material such as a phenolic condensation product. The shielded cable 29 extends through an aperture 33 formed in a side of the housing 30 and the inner conductor thereof is connected to one end of the coil winding while the shielding is connected to the opposite end.

The housing 30 is slidably mounted in and extends upwardly through an aperture 35 formed through the central portion of a disc 36 and the upper end of the housing is disposed in a suitably formed recess 37 formed in a handle 38, the handle 38 being rigidly fixed to the disc 36. A helical spring 39 is located in the upper portion of the recess 37 intermediate the upper end thereof and the upper end of the housing 30, thus resiliently urging the housing downward, as viewed in Fig. 3. The housing is prevented from being forced out of the handle 38 by a combined stop member and indicator 40 which is mounted on one side thereof and is longitudinally movable with respect to the handle 38 in a slot 41 formed in the lower portion of the adjacent side thereof, as shown in Figs. 2 and 3. A plate 42, formed of a transparent material, is mounted across the outer portion of the slot 41 and may be suitably calibrated to indicate the relative position of the probe with respect to the lower ends of three pedestal members 43 which are mounted on the lower side of the disc 36 and radially spaced from the center thereof to provide a support for the probe. It will be apparent that when this probe is placed on a concave or convex curved surface, the end of the probe will move downwardly past the plane of the ends of the pedestal members 43 or will move upwardly into the handle respectively, and that by a proper calibration of the transparent plate 42, the radius of curvature can be read directly. Since the indication produced by the circuit associated with the coil is directly affected by the amount of metal adjacent the coil, and since the radius of curvature of the surface determines the amount of metal lying in any given plane, the importance of knowing the radius of curvature of the surface being tested is apparent.

In using a probe, such as that described having a flat end adjacent the lower side of the coil 28, when such a probe is placed on a surface having a radius of curvature, unless the exact center of the end of the probe bears against the surface, the coil will be spaced from the surface a distance which it is extremely difficult to calculate. In order to overcome this difficulty, in accordance with the present invention, a pivot button 45 is provided at the center of the lower end of the probe housing 30 and extends from the lower surface thereof a short distance; the pivot may comprise a short extension of the core 31. With a housing 30 approximately ½ inch in diameter, a button extending .001 to .0015 inch from the lower end thereof may be used. By providing the button 45 it will be apparent that the coil is spaced a predetermined distance from the surface being examined and that tipping of the probe with respect to the surface is in large measure compensated, since as one side of the coil moves closer to the surface being examined when the probe is tipped, the opposite side of the coil moves away an equivalent distance.

By providing the tripod support, hereinbefore described, tipping of the probe is of course held to a minimum. On flat surfaces substantially no tipping whatever is encountered. On convex or concave surfaces, the housing 30 carrying the coil moves upward into the handle 38 against the pressure of the spring 39 or moves downward therefrom, respectively, and the button 45 spaces the coil 28 a fixed distance from the surface being examined irrespective of the radius of curvature or the direction of curvature. It will be understood, of course, that with surfaces having a very small radius of curvature a smaller dimensioned probe must be used and that the thickness of the button 45 must be selected with consideration of the minimum radius of curvature of the surfaces to be examined. Using a housing 30 having a diameter of approximately ½ inch and a button extending from the lower end of the housing approximately .001 inch, a surface having a radius of curvature on the order of 6 inches may be accurately examined.

In the operation of this apparatus, the probe is placed on a sample of bare metal of the type on which the coating or film to be measured is put, and the capacitance 26 is adjusted to zero beat frequency with the capacitance 27 set at zero. Then the probe is placed on the coating or film to be measured with the metal base underneath and the capacitance 27 is again adjusted to zero beat frequency. The required adjustment of the capacitance 27 may then be utilized as an indication of the coating or film thickness, having reference to a previously made calibration chart. Since there is some unavoidable locking of oscillators as the beat frequency approaches the minimum, it is desirable to approach the minimum always from the same side, that is, by tuning the variable oscillator always from a frequency higher than that of the fixed oscillator, or always from a lower frequency. In this way the error due to locking is largely compensated.

It is obvious that any oscillator circuit capable of operation at the frequencies desired may be employed in the place of that shown, although the Colpitts circuit is stable and satisfactory for the purposes indicated. Likewise any type of oscillator coupling and (if desired) beat frequency amplifier may be used.

It has been found that by employing oscillator frequencies of about 50 kilocycles or higher the inductance change in the coil 28, and hence the frequency change of the oscillator, is practically independent of the thickness of the underlying conductor for conductors over .020 inch thick and having conductivities equal to or greater than aluminum. For conductors of lesser conductivities the thickness is of less effect. In any event the instrument of this invention may be calibrated for any practical thickness of underlying conductor and coating thereon.

By using several variable capacitances in parallel with the capacitance 27 and connected so as to be selected by a switch, more than one range may be obtained in measuring the film thicknesses. Measurements obtained by the instrument described have been determined with an accuracy such that the percentage error is not greater than about 5% for films as thin as .001 inch.

While this invention has been shown and described in conjunction with but one embodiment thereof it will be apparent that many changes and modifications may be made therein without departing from the spirit or scope of the present invention.

The invention shown and described herein may be manufactured and used by or for the Government of the United States of America for governmental purposes without the payment of any royalties thereon or therefor.

What is claimed is:

1. In an apparatus for measuring the thickness of a non-conducting film on a non-magnetic conducting base, a pick-up probe, a super-audio frequency oscillator comprising a frequency determining coil located in an end of said probe, and means associated with said probe for predetermining the location of said coil with respect to a surface being examined.

2. In an apparatus for measuring the thickness of a non-conducting film on a non-magnetic conducting base, a pick-up probe, a super-audio frequency oscillator comprising a frequency determining coil located in an end of said probe, and a button mounted on the end of said probe adjacent said coil for predetermining the location of said coil with respect to a surface being examined.

3. In an apparatus for measuring the thickness of a non-conducting film on a non-magmetic base, a pick-up probe, a super-audio frequency oscillator comprising a frequency determining coil located in an end of said probe, and means associated with said probe for compensating for tipping of said coil with respect to a surface being examined.

4. In an apparatus for measuring the thickness of a non-conducting film on a non-magnetic conducting base, a pick-up probe, a super-audio frequency oscillator comprising a frequency determining coil located in an end of said probe, and means associated with said probe for compensating for tipping of said coil with respect to a surface being examined, said means comprising a button mounted on said end of said probe adjacent said coil for predetermining the location of said coil with respect to a surface being examined.

5. In an apparatus for measuring the thickness of non-conducting material on a non-magnetic conducting base, a fixed oscillator of a super-audio frequency, a variable oscillator having a frequency range including the frequency of said super-audio frequency oscillator, coupling means for determining the difference in frequency between the output of said oscillators, a tuned circuit in said variable oscillator comprising an inductance adapted to be placed a fixed minimum distance from the surface of said film whereby the frequency of said variable oscillator is altered in accordance with the spacing between said inductance and said base, and means associated with said inductance for predetermining the minimum spacing between said film and said inductance.

6. An apparatus for measuring the thickness of electrically non-conducting materials comprising, in combination, a non-magnetic sheet of electrically conducting material adapted to have non-conducting sheets placed thereon, an oscillation circuit having a fixed frequency in the super-audio range, a second oscillator having a variable frequency in the same frequency range, said variable frequency oscillator including a variable condenser and an inductance coil adapted to be placed a fixed minimum distance from said sheet of non-magnetic material, means for predetermining the minimum spacing between said coil and said sheet, and a detector circuit for indicating the differences of frequency between the oscillation produced by said oscillator circuits whereby the distance of said coil from said sheet of non-magnetic conducting material can be determined by measuring the difference in frequency between the oscillations produced by said oscillators.

7. In an apparatus for measuring the thickness of a non-conducting film on a non-magnetic conducting base, a pick-up probe, a super-audio frequency oscillator comprising a frequency determining coil located in an end of said probe, means associated with said probe for urging said coil toward the surface of said film, means associated with said probe for predetermining the location of said coil with respect to said surface being examined and means for utilizing the change in the frequency of oscillation of said signal upon the bringing of said coil into proximity with said non-magnetic base for measuring the thickness of said film.

8. In an apparatus for measuring the thickness of a non-conducting film on a non-magnetic conducting base, a pick-up probe, a super-audio frequency oscillator comprising a frequency determining coil located in an end of said probe, means associated with said probe for urging said coil in a direction toward the surface of said film, means associated with said probe for predetermining the minimum spacing between said coil and said surface and means for utilizing the change in the frequency of oscillation of said signal upon the bringing of said coil into proximity with said non-magnetic base for measuring the thickness of said film.

9. In an apparatus for measuring the thickness of a non-conducting film on a non-magnetic conducting base, a pick-up probe, a super-audio frequency oscillator comprising a frequency determining coil located in an end of said probe, and a button mounted on the outer end of said probe substantially on the axis of said coil for predetermining the minimum spacing between said coil and a surface of said film.

10. In an apparatus for measuring the thickness of a non-conducting film on a non-magnetic conducting base, a pick-up probe, a super-audio frequency oscillator comprising a frequency determining coil located in an end of said probe, means locating said coil with the longitudinal axis thereof substantially normal to the surface of said film, and means spacing said coil a predetermined distance from said surface to compensate for deviations of said axis from a position normal to said surface.

11. In a film thickness measuring apparatus, a device for producing electrical oscillations in the super-audio range, a tuned circuit including an inductance coil connected to said device to determine the frequency of said oscillations, a pick-up probe, said probe including a cylindrical member having a hollow end, means mounting said inductance coil in the hollow end of said member, mounting means to position the cylindrical member on the film to be measured with the longitudinal axis thereof normal to the film surface, and a member extending from the hollow end of said member coincident with the longitudinal axis thereof to space the inductance coil from the film surface.

12. The method of measuring the thickness of a non-conducting film backed by a non-magnetic conductive sheet which comprises mixing two sources of electrical oscillations within a frequency band in the super-audio range at which stray capacitance effects are negligible to produce a beat frequency note within the audio frequency range responsive to a frequency difference between said sources, connecting to one of said sources a tuned circuit including an inductance, placing said inductance a predetermined fixed distance from the film, varying the parameters of the tuned circuit to make the frequency of said one source of oscillations equal to the frequency of the other source, and indicating the thickness of said film as a function of the change in frequency of the oscillations of said one source.

13. The method of measuring the thickness of a non-conducting film which comprises connecting an inductance to an electric circuit to form an oscillatory circuit having a frequency in the super-audio band, placing said inductance adjacent to a non-magnetic conductive base to establish a reference frequency of said oscillations, placing the non-conducting film on the non-magnetic conductive base, placing said inductance adjacent said film and indicating the thickness of the film as a function of the change in frequency of said oscillations from said reference frequency.

14. The method of measuring the thickness of a non-conducting film which comprises coupling an inductance to an electric circuit to form an oscillatory circuit operative to produce electrical oscillations having a frequency on the order of over 50 kilocycles, placing said inductance adjacent said film whereby the frequency of the oscillatory circuit is changed, and indicating the thickness of said film as a function of the change in frequency of said oscillations.

JACOB E. DINGER.

REFERENCES CITED

The following references are of record in the file of this patent:

UNITED STATES PATENTS

| Number | Name | Date |
| --- | --- | --- |
| 1,093,307 | Becker | Apr. 14, 1914 |
| 1,815,710 | Guillemin | July 21, 1931 |
| 1,815,717 | Kranz | July 21, 1931 |
| 1,880,802 | Chilson | Oct. 4, 1932 |
| 1,943,619 | Mudge et al. | Jan. 16, 1934 |
| 2,033,654 | Selquist et al. | Mar. 10, 1936 |
| 2,083,759 | Temple | June 15, 1937 |
| 2,136,675 | Danse | Nov. 15, 1938 |
| 2,219,282 | Harder et al. | Oct. 29, 1940 |
| 2,393,717 | Speaker | Jan. 29, 1946 |
| 2,422,742 | Odessy | June 24, 1947 |
| 2,437,639 | Floyd | Mar. 9, 1948 |